United States Patent [19]

Nakamura

[11] Patent Number: 4,943,122
[45] Date of Patent: Jul. 24, 1990

[54] CENTER HUB CAP FOR VEHICLE WHEELS

[75] Inventor: Takao Nakamura, Yokohama, Japan

[73] Assignee: Hashimoto Forming Industry Co., Ltd., Yokohama, Japan

[21] Appl. No.: 400,687

[22] Filed: Aug. 30, 1989

[51] Int. Cl.⁵ .............................................. B60B 7/06
[52] U.S. Cl. ................................ 301/108 A; 301/37 P
[58] Field of Search ............... 301/37 R, 37 P, 37 TP, 301/37 PB, 108 R, 108 A

[56] References Cited

U.S. PATENT DOCUMENTS

| 4,458,952 | 7/1984 | Foster et al. | 301/378 X |
| 4,603,915 | 8/1986 | Heintz | 301/37 P |

FOREIGN PATENT DOCUMENTS

| 61-134401 | 8/1986 | Japan . | |
| 63-4801 | 1/1988 | Japan . | |
| 2091652 | 8/1982 | United Kingdom | 301/37 R |
| 2113158 | 8/1983 | United Kingdom | 301/37 R |

Primary Examiner—Russell D. Stormer
Attorney, Agent, or Firm—Stevens, Davis, Miller & Mosher

[57] ABSTRACT

A center hub cap for vehicle wheels includes a dish-like main body of a synthetic resin material, as well as hollow and substantially cylindrical projections and retainer legs. These projections and legs are both formed integrally with the main body to protrude axially inwardly from the inner surface of the main body, and arranged alternately with each other. The projections radially support an annular spring ring for urging the retainer legs radially outwardly toward the inner peripheral wall of a recessed center portion of the wheel, and are provided with shoulder portions to axially maintain the spring ring in engagement with the retainer legs.

7 Claims, 4 Drawing Sheets

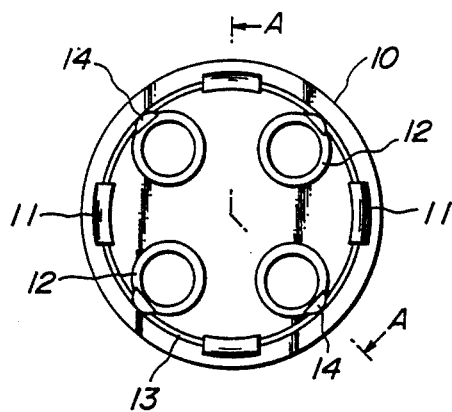
FIG_1
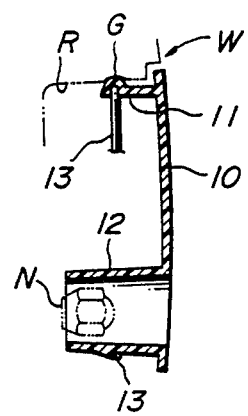
FIG_2

FIG_3
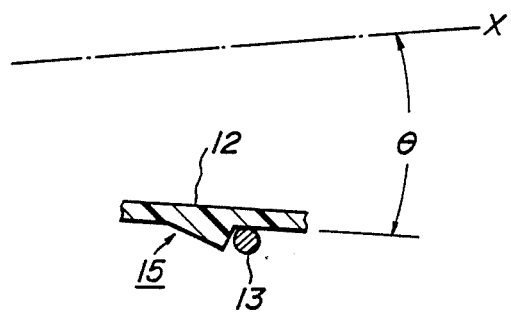
FIG_4
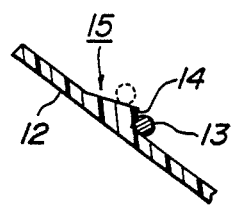

FIG_8a
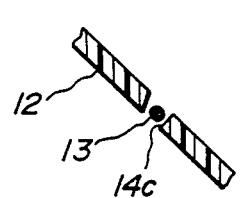
FIG_8b
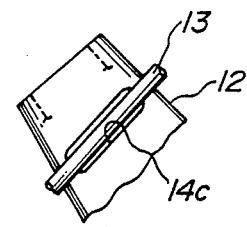
FIG_9
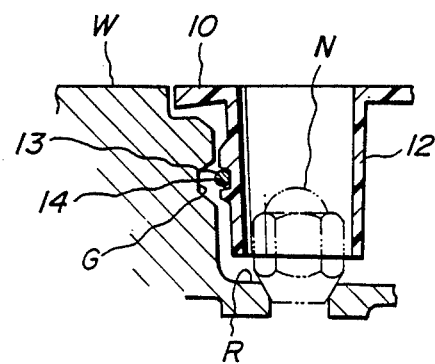

CENTER HUB CAP FOR VEHICLE WHEELS

BACKGROUND OF THE INVENTION

1. Field of the Invention

The present invention relates to a center hub cap for a vehicle wheel adapted to be secured to a hub of a vehicle.

2. Description of the Related Art

A center hub cap is generally composed of a synthetic resin material, and used in combination with a vehicle wheel which includes a center portion recessed from an axially outer surface side of the wheel and defined by an inner peripheral wall. The center portion of the wheel has a bottom wall with an axially inner surface to be brought into abutting engagement with an axially outer surface of the hub. The bottom wall of the center portion of the wheel is to be secured to the hub by a plurality of fastener elements, such as bolts extending through the bottom wall.

The center hub cap is to be engaged with the inner peripheral portion of the center portion of the wheel, and includes a substantially dish-like main body composed of a synthetic resin material, having axially inner and outer surfaces, as well as retainers for retaining the hub cap in engagement with the wheel. As disclosed, e.g. in Japanese Utility Model Application Laid-open Publication No. 63-4,801, the retainers of known center cap include a plurality of retainer legs which are formed integrally with the main body to protrude from the inner surface of the main body, and an annular spring ring composed of a resilient material for urging the retainer legs radially outwardly of the main body toward the inner peripheral wall of the center portion of the wheel. A plurality of support ribs on the inner surface of the main body are arranged adjacent to respective retainer legs, and each formed with a cutout portion to retain the spring ring in place.

In the known arrangement of the center hub cap mentioned above, the combination of the retainer legs and the support ribs which cooperate with each other to retain the spring ring radially of the main body has proved to be quite problematic in that it cannot stably maintain the spring ring in engagement with the retainer legs and to effectively prevent undesired disengagement of the spring ring from the retainer legs axially inwardly of the main body. Needless to say, the spring ring which has been disengaged from the retainer legs does not achieve the desired function of resiliently urging the retainer legs toward the inner peripheral surface of the center portion of the wheel, as a result of which it becomes impossible to stably retain the hub cap in place. While the support ribs could be modified so as to prevent the undesired disengagement of the spring ring axially inwardly of the main body, it then becomes impossible or at least very difficult to mount the spring ring into engagement with the retainer legs.

SUMMARY OF THE INVENTION

Consequently, it is a principal object of the present invention to provide an improved center hub cap with a retainer including an annular spring ring, which can be stably maintained in engagement with the retainer legs and positively prevented from undesired disengagement therefrom radially and axially of the main body, and which can still be readily mounted in place.

Briefly stated, the present invention provides a center hub cap which comprises a substantially dish-like main body composed of a synthetic resin material, and a plurality of hollow and substantially cylindrical projections formed integrally with the main body to protrude axially inwardly from the inner surface of the main body, which serve to accommodate therein respective heads of fastener elements.

The hub cap according to the present invention further comprises a retainer means for retaining the hub cap in engagement with the wheel, including a plurality of retainer legs which are formed integrally with the main body to protrude axially inwardly from the inner surface of the main body, and arranged between neighboring pair of the projections, as well as an annular spring ring for urging the retainer legs radially outwardly of the main body toward the inner peripheral wall of the center portion of the wheel.

Each projection is provided, on that region of its outer peripheral surface which is arranged radially outwardly of the main body, with a shoulder portion adapted to axially maintain the spring ring in engagement with the retainer legs and radially support the ring between two neighboring retainer legs.

With such an arrangement of the present invention, the projections on the inner surface of the main body are provided with shoulder portions as means for axially maintaining the spring ring in engagement with the retainer legs and radially supporting the ring between two neighboring retainer legs. Because of the hollow and substantially cylindrical configuration, the projections provide a sufficient strength or rigidity against bending moment by which they tend to deflect radially inwardly of the main body when supporting the spring ring. Moreover, the spring ring can be brought into a slidable point contact with the outer peripheral surface of the projections, and can thus be readily engaged with the shoulder portion when mounting into place.

BRIEF DESCRIPTION OF THE DRAWINGS

FIG. 1 is a rear view of the center hub cap according to one embodiments of the present invention;

FIG. 2 is a sectional view taken substantially along the line A—A in FIG. 1;

FIG. 3 is a fragmentary sectional view showing the shoulder portion on the substantially cylindrical projection;

FIG. 4 is a fragmentary view showing the manner of mounting the spring ring into engagement with the shoulder portion of FIG. 3;

FIGS. 6, 7, 8a and 8b are views showing various modifications of the shoulder portion in the projections; and FIG. 9 is a view showing the relation between the center hub cap and the vehicle wheel.

DETAILED EXPLANATION OF THE PREFERRED EMBODIMENTS

Figure 5:
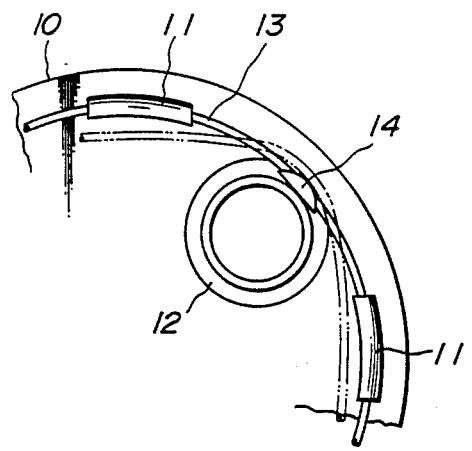
FIG. 5 is a fragmentary rear view showing the spring ring retained in place with the cylindrical projections and the retainer legs.

The present invention will now be explained in further detail, with reference to some preferred embodiments shown in the accompanying drawings.

As mentioned hereinbefore, the center hub cap according to the present invention is used in combination with a vehicle wheel W to be secured to a hub of a vehicle, not shown. The wheel W includes a center portion R which is recessed from an axially outer surface side of the wheel and defined by an inner peripheral wall. The center portion has a bottom wall with an axially inner surface which is to be brought into abutting engagement with an axially outer surface of the hub. The bottom wall of the wheel W is adapted to be secured to the hub by a plurality of fastener elements, e.g. so-called wheel bolts which extend through the bottom wall. The center hub cap is adapted to be engaged with the inner peripheral wall of the center portion of the wheel in a manner to be described hereinafter.

Referring firstly to FIG. 1, there is shown a center hub cap according to one embodiment of the present invention which includes a substantially dish-shaped main body 10 composed of an appropriate resilient synthetic resin material. The main body 10 has an axially inner surface which, as also shown in FIG. 2, is integrally provided with a plurality of retainer legs 11 protruding axially inwardly of the main body 10. These retainer legs 11 are to be brought into engagement with a circumferential groove G in the inner peripheral wall of the center recessed portion R of the vehicle wheel W (FIG. 2). The inner surface of the main body 10 is further integrally provided with a plurality of hollow and substantially cylindrical projections 12 also protruding axially inwardly of the main body 10. These projections 12 serve to accommodate respective heads of the fastener elements, e.g. nuts N for the wheel bolts. The retainer legs 11 and the projections 12 are arranged along the outer periphery of the main body 10, alternately with each other at a predetermined constant angular distance.

The main body 10 is further provided with an annular spring ring 13, which is composed of a resilient wire material and which serves to resiliently urge the retainer legs 11 radially outwardly of the main body 10 toward the inner peripheral wall of the center portion of the wheel. Each retainer leg 11 has an axially inner free end with a recess in its radially inner surface, which recess is adapted to engage with the spring ring 13. The spring ring 13 is maintained in place, i.e. in engagement with the retainer legs 11, by respective outer peripheral surfaces of the projections 12. To this end, shoulder portions 14 are formed on those outer peripheral surface regions of respective projections 12 which are arranged radially outwardly of the main body 10. Each shoulder portion 14 is arranged at an axial location corresponding to that of the recess in the retainer leg 11, and serves also to radially support the spring ring 13 between two neighboring retainer legs 11.

Each shoulder portion 14 is preferably arranged on axially outer side of, and adjacent to a guide region 15 on the outer peripheral surface of the relevant projection 12. The guide region 15 is slightly inclined with reference to the center axis X of the hub cap, and may be in the form of a lug which, as shown in FIGS. 2 to 4, protrudes radially outwardly of the main body 10. Each guide region 15 thus serves to guide the spring ring 13 during insertion thereof into a space axially behind the shoulder portion 14. The projection 12 may also have an outer peripheral surface which is slightly tapered at an angle $\theta$ (FIG. 3) with reference to the center axis X so that its outer diameter decreases axially inwardly of the main body 10. In this case, the guide region 15 may also include the tapered surface of the projection 12.

In order to mount the annular spring ring 13 in place, the ring 13 is slid along the outer peripheral surface of the projections 12 from an axially inner side of the main body 10, and is guided by the guide region 15. Advantageously, the guide region 15 protrudes radially outwardly beyond the inner periphery of the spring ring 13 as it is retained in place by the shoulder portion 14 so that, as shown in FIGS. 4 and 5, the ring 13 undergoes an elastic deformation during the above-mentioned sliding movement to ride over the guide region 15 into the space behind the shoulder portion 14.

On this occasion, the projections 12 are subjected by the spring ring 13 to a bending moment and tend to deflect radially inwardly of the main body 10. However, due to the hollow and substantially cylindrical configuration, the projections 12 are strong or rigid enough to sufficiently withstand such bending moment and to prevent surface deformation of the main body 10.

The spring ring 13, which can be readily mounted in place to resiliently urge the retainer legs 11 radially toward the inner peripheral wall of the recessed center portion of the vehicle wheel, is thus stably supported by the projections 12 radially and also effectively prevented by the shoulder portions 14 from undesired axial disengagement from the retainer legs 11.

Figure 6:
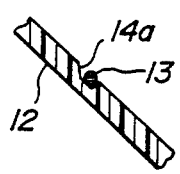
Figure 7:
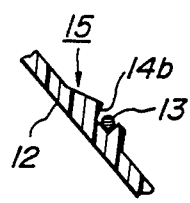

The shoulder portion 14 of the projection 12 for axially maintaining the spring ring 13 in place may be constituted in various manners. For example, each shoulder portion 14 may be composed of a wall of a recess 14a formed in the outer peripheral surface of the projection 12 by partly reducing the thickness of its material (FIG. 6), or of ridges on the outer peripheral surface of the projection 12 which are spaced from each other by a distance corresponding to the thickness of the spring ring 13 to define a recess 14b therebetween (FIG. 7), or of the periphery of a through-opening 14c in the outer peripheral surface of the projection 12 formed locally removing its material (FIGS. 8a, 8b).

The hub cap according to the present invention is inserted into the recessed center portion of the wheel axially inwardly, resiliently deflecting each retainer leg 11 radially inwardly of the main body 10 against the resilient force of the spring ring 13. When the hub cap is correctly inserted, there is formed a slight clearance between the inner peripheral wall of the center portion R of the wheel W and the radially outermost portion of the projections 12 of the hub cap, as shown in FIG. 9. The retainer legs 11 have such a flexibility in the radial direction as to compensate for any misalignment between the axis of the wheel and the axis X of the hub cap during or after the assembly of the hub cap. Thus, the hub cap can be stably retained in engagement with the wheel without the risk of dangerous and thus undesirable separation of the hub cap from the wheel.

It will be appreciated from the foregoing description that the present invention provides an improved center hub cap with a retainer including an annular spring ring, which can be stably maintained in engagement with the retainer legs and positively prevented from undesired disengagement therefrom radially and axially of the main body, and which can still be readily mounted in place.

While the present invention has been explained with reference to certain preferred embodiments, these are by way of examples only, and a number of modifications and/or variations can be made without departing from the scope of the invention. For example, the substantially cylindrical projections may each have an axially outer end which is closed by the main body to cover the fastener element.

What is claimed is:

1. A center hub cap for use with a vehicle wheel which is to be secured to a hub of a vehicle, and which includes a center portion recessed from an axially outer surface side of the wheel and defined by an inner peripheral wall, said center portion having a bottom wall with an axially inner surface to be brought into abutting engagement with an axially outer surface of said hub, said bottom wall of the wheel being adapted to be secured to said hub by a plurality of fastener elements through said wall; wherein said center hub cap is adapted to be engaged with said inner peripheral wall of the center portion of the wheel, and comprises:

[A] a substantially dish-like main body composed of a synthetic resin material, and having axially inner and outer surfaces;

[B] a plurality of hollow, substantially cylindrical projections formed integrally with said main body to protrude axially inwardly from said inner surface of the main body, and adapted to accommodate therein respective heads of said fastener elements;

[C] retainer means for retaining the hub cap in engagement with the wheel, including (i) a plurality of retainer legs which are formed integrally with said main body to protrude axially inwardly from the inner surface of said main body, and arranged between neighboring pair of said cylindrical projections, and (ii) an annular spring ring composed of a resilient material for resiliently urging said retainer legs radially outwardly of said main body toward said inner peripheral wall of the center portion of the wheel; and

[D] means for axially maintaining said spring ring in engagement with said retainer legs, including shoulder portions on those outer peripheral surface regions of respective projections which are arranged radially outwardly of said main body, each shoulder portion being adapted to radially support said spring ring between two neighboring retainer legs.

2. The center hub cap as claimed in claim 1, wherein said shoulder portions are each arranged adjacent to, and on axially outer side of a slightly inclined guide region of the outer peripheral surface of relevant one of said projections, each guide region being adapted to guide said spring ring during insertion thereof into a space axially behind said shoulder portion.

3. The center hub cap as claimed in claim 2, wherein said guide region includes a slightly tapered outer peripheral surface of relevant one of said projections, whose diameter decreases axially inwardly of said main body.

4. The center hub cap as claimed in claim 2, wherein said guide region includes a lug protruding from the relevant outer peripheral surface of said projection radially outwardly of said main body.

5. The center hub cap as claimed in claim 4, wherein said projections each has a slightly tapered outer peripheral surface, whose diameter decreases axially inwardly of said main body.

6. The center hub cap as claimed in claim 1, wherein said retainer legs are adapted to be brought into engagement with a circumferential groove which is formed in the inner peripheral wall of the center recessed portion of the wheel.

7. The center hub cap as claimed in claim 1, wherein said retainer legs each has a recess in its inner surface region arranged radially inwardly of said main body, which recess cooperates with said shoulder portions of neighboring projections to retain said spring ring in place.

* * * * *